United States Statutory Invention Registration [19]

[11] Reg. Number: H288

Gutleber [43] Published: Jun. 2, 1987

[54] INTERFERENCE CANCELLING TRANSMITTER

[75] Inventor: Frank S. Gutleber, Monmouth, N.J.

[73] Assignee: The United States of America as represented by the Secretary of the Army, Washington, D.C.

[21] Appl. No.: 517,191

[22] Filed: Jul. 25, 1983

[51] Int. Cl.[4] ..... H04B 7/00; H04B 1/02

[52] U.S. Cl. ..... 342/367; 455/105

[58] Field of Search ..... 343/367, 350, 379–384; 455/129, 105, 103, 107

[56] References Cited

U.S. PATENT DOCUMENTS

| | | | |
|---|---|---|---|
| 4,173,748 | 11/1979 | Lewandowski | 343/379 |
| 4,275,397 | 6/1981 | Gutleber | 343/368 |
| 4,450,448 | 5/1984 | Albanese et al. | 343/379 |

FOREIGN PATENT DOCUMENTS 1129086 8/1982 Canada .

*Primary Examiner*—Stephen C. Buczinski
*Assistant Examiner*—Linda J. Wallace
*Attorney, Agent, or Firm*—Sheldon Kanars; Jeremiah G. Murray; Paul A. Fattibene

[57] ABSTRACT

An interference cancelling transmitter is configured which provides electromagnetic compatibility (EMC) among different communications apparatus in the same area as well as providing a low probability of intercept (LPI) in a dense communications environment where secure communications is required between users. This is accomplished by means of a communications transmitter coupled to a transmitting antenna configuration comprised of an omnidirectional antenna and a notch antenna having a single deep null over a small angular beamwidth. RF power is fed equally thereto so that the radiated power from each antenna is the same but the phase is mutually inverted (180°) so that a cancellation of the radiated power occurs in all directions of space except over the angular region where the null of the notch antenna is located. The null can be varied in direction and results in a relatively narrow pencil-like radiation pattern being radiated to a predetermined receiver.

18 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INTERFERENCE CANCELLING TRANSMITTER

The invention described herein may be manufactured, used and licensed by or for the Government for governmental purposes without the payment to me of any royalties thereon or therefor.

FIELD OF THE INVENTION

This invention relates generally to communications systems and more particularly to communications systems in which simple, relatively inexpensive arrangements are utilized to automatically eliminate or reduce external interference.

BACKGROUND OF THE INVENTION

As is well known and understood, one of the major concerns of designers of antenna system communications links is the elimination or reduction of external interference sources such as jamming, self-interference, atmospheric noise, and man-made noise. Also as is well known, most arrangements which attempt to resolve these problems of external interference do so in a relatively complex manner, often utilizing very large directional antennas and/or with antennas having hundreds or even more elements. This problem of external interference is particularly prevalent in the area of mobile communications systems where omnidirectional antennas are employed, because of the large number of users operating in the same frequency band and because of multipath. Use of very large directional antennas in mobile communications, moreover, is almost physically impossible and economically impractical.

A new concept for eliminating interference in a communications system utilizing a plurality of transmission links is shown and described in U.S. Pat. No. 4,275,397, entitled, "Interference Cancelling Random Access Discrete Address Multiple Access System", which issued to Frank S. Gutleber, the present inventor, on June 23, 1981. The system disclosed therein utilizes orthogonal multiplexing in conjunction with a receiver antenna configuration comprised of an omnidirectional antenna and a notch antenna at the receiving end of the transmission link to cancel interference arriving from all directions except over the narrow beamwidth's notch or null formed by the notch antenna.

Accordingly, it is an object of the present invention to eliminate external interference at the transmitting end of a transmission link.

Another object of the invention is to minimize the interference caused by radiating sources by effectively radiating only in the direction of the desired signal.

Still a further object of the invention is to provide an interference cancelling transmitter operating in a dense communications environment.

And yet another object of the invention is to provide electromagnetic compatability and low probability of intercept in a multiple user communications system.

SUMMARY OF THE INVENTION

These and other objects are achieved by means of a communications transmitter whose power output is fed to a power divider and equally coupled to an omnidirectional antenna and a notch antenna having a single deep null over a small angular beamwidth. The phase of the power signal coupled to one of the antennas is shifted by 180° so that the radiated power from each of the antennas is substantially equal but the phase between the two is mutually inverted, resulting in a cancellation of the radiated power in all directions of space except for the region of the null of the notch antenna and providing thereby a relatively narrow beam of radiation at the location of the null.

DESCRIPTION OF THE PREFERRED EMBODIMENT

Figure 1:
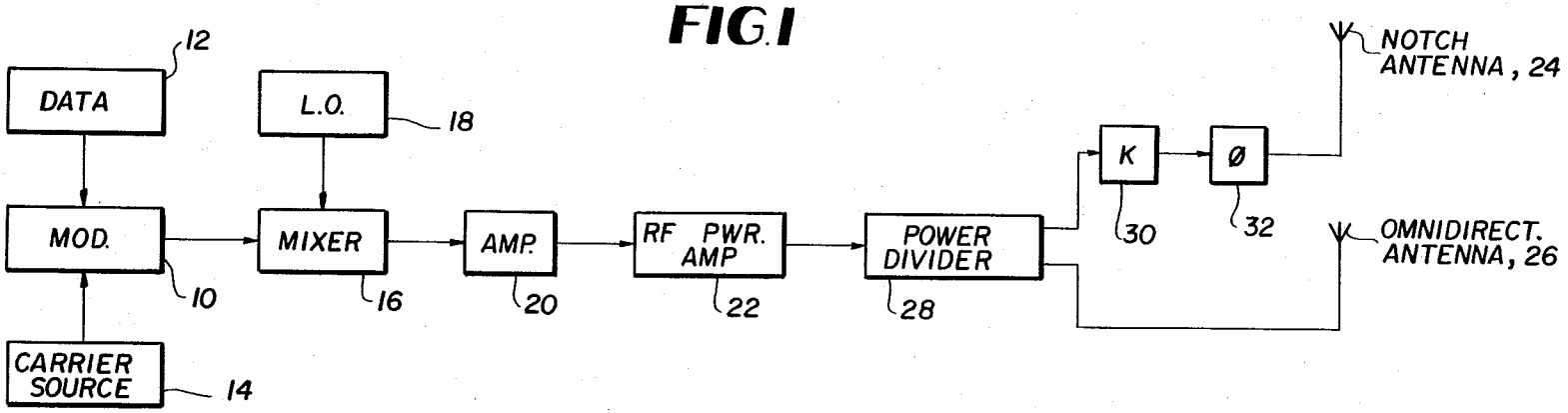
FIG. 1 is a functional block diagram illustrative of transmitter apparatus in accordance with the principles of this invention.

Referring now to the drawings and more particularly to FIG. 1, shown therein is an interference cancelling transmitter particularly adapted for use in tactical, highly mobile systems such as a mobile subscriber access communications system which operates in the HF, VHF or UHF frequency band and where it is desirable to minimize the interference caused by multiple radiating sources in the system by effectively radiating only a relatively narrow pencil-like beam in the direction of the desired signal. As shown in FIG. 1, reference numeral 10 designates a signal modulator to which is coupled a communications (data) signal source 12 and a carrier signal source 14. The output of the modulator 10 comprises a carrier signal modulated with the communications signal and is fed to a mixer 16 which additionally receives as an input a local oscillator signal from a local oscillator 18. The output of the mixer is coupled to and amplified by a first amplifier 20 and then to an RF power amplifier 22.

The output of the power amplifier 22 is coupled to a radiating antenna configuration comprised of a notch antenna 24 having a single deep null over a small angular beamwidth and an omnidirectional antenna 26. Power is coupled thereto by means of a power divider 28 which may or may not inherently include means for coupling the same amount of power equally to both antennas while reversing the phase of one power signal by 180°. For purposes of illustration, however, FIG. 1 depicts amplitude and phase adjusting circuits 30 and 32 coupled in series in the branch connecting the power divider 28 to the notch antenna 24. When desirable, other arrangements may be resorted to.

Figure 2:
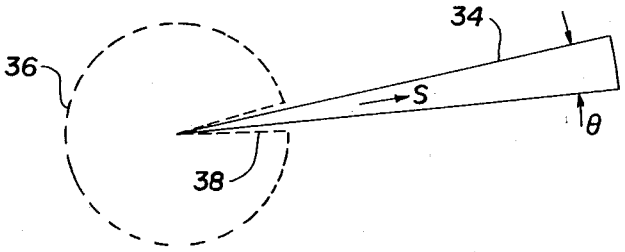
FIG. 2 is a diagram illustrative of the antenna pattern generated by the antenna system of FIG. 1.

The resulting radiation pattern from the notch antenna 24 and the omnidirectional antenna 26 comprises a composite pattern in the form of a relatively narrow beam of radiation 34 as shown in FIG. 2, which results from the cancellation of the radiated power in all directions of space as indicated by circular broken line 36 except in the region of the null of the notch antenna as indicated by the broken line 38. The notch antenna 24 radiates a pattern indicated by the broken lines 36 and 38 shown in FIG. 2, while the omnidirectional antenna 26 radiates a pattern of equal amplitude in all directions. Furthermore, by rotating the notch antenna 24 or electronically scanning it, the notch can be selectively pointed in the direction of the desired signal transmission. The communications signal radiation is effectively provided only in the direction of the desired signal over the angular sector $\theta$ since radiation in all of the other directions is cancelled or subtracted in space. This also reduces considerably the possibility of being intercepted.

Figure 3:
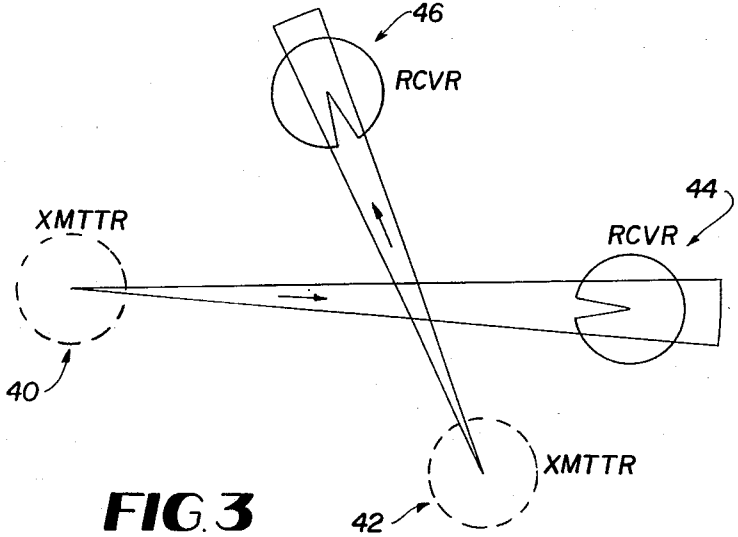
FIG. 3 is a diagram illustrative of utilization of the subject invention in a multiple access communications system.

An application for the concept is for a mobile subscriber access system which is illustrated in FIG. 3, where, for example, four participants 40, 42, 44 and 46 are communicating and where the participants 40 and 42, for example, comprise transmitters of the type shown in FIG. 1 while the participants 44 and 46 comprise receivers in accordance with the teachings of the above referenced U.S. Pat. No. 4,275,397. In such a system, each of the participants both for transmitting and receiving employ antenna configurations comprised of both an omnidirectional antenna and a notch antenna. In the past, in order to reduce interference between these users, complex frequency coding, time coding and pseudo noise coding has been employed while operating with omnidirectional antennas. It will be apparent that as the numbers of participants increase, the interference problem increases as well and the inherent complexity of the system results in significantly increased cost to maintain an acceptable degree of operation. Accordingly, use of narrow pencil beamwidth antennas not only at the receiving end of the transmission link, but also at the transmitting end of the link provides an improvement in communications heretofore not realizable for mobile communications and particularly for small lightweight tactical communications equipment due to the fact that all interference which is outside of the notch beam is virtually eliminated without requiring any complex adaptive processing or requiring a large complex narrow beam antenna.

It is also readily apparent that the notch antenna 24, FIG. 1, comprises the main element in the interference cancelling transmitter shown and heretofore described. It moreover introduces requirements for operation that are not normally encountered in a typical antenna design. For example, instead of being concerned with a design which forms a direct beam having low sidelobes or designing an adaptive system having several movable nulls, the antenna design is here concerned with providing a fixed pattern which contains uniform reception in all directions, except over a small angular sector where a deep null is desired. Additionally, to be effective, the antenna design needs a slope in the pattern developed at the point of the null to be as steep a slope as is practical. General design procedures for providing an array antenna having the type of characteristic are described in the present inventor's U.S. Pat. Nos. 3,130,410 and No. 3,605,106 and invention disclosure docket No. 19599. As noted therein, such patterns are made up of products and/or sums of [sin mx/sin x] functions and can be achieved by controlling both the amplitudes and spacing of array antenna elements; as a result, the slope of a null in an antenna beam pattern can be made steep, either by providing one or more $[\sin mx/\sin x]^{\nu}$ terms or by appropriate amplitude and phase control when summing several [sin mx/sin x] functions using subarrays. Further explanation can be had by referring to these patents and invention disclosure as well as to an article entitled, "Coded Linear Array Antenna", published in Volume 39, No. 2, of Electrical Communications Magazine.

Having thus shown and described what is considered at present to be the preferred embodiment of the present invention, it will be readily apparent that modifications may be resorted to by those skilled in the art without departing from the spirit and scope of the invention. Accordingly, all alterations, changes coming within the scope of the present invention as set forth in the appended claims are herein meant to be included.

I claim:

1. A multiple access signal communication system, comprising the combination of:

means for generating an RF signal modulated with a communication signal;

first antenna means, coupled to said RF signal generating means, for generating a first substantially omnidirectional antenna beam pattern;

second antenna means, coupled to said RF signal generating means, for generating a second substantially omnidirectional antenna beam pattern having a single notch of narrow angular beamwidth;

said first and second antenna means for generating beam patterns which interact to generate a composite antenna beam pattern of a relatively narrow angular beamwidth;

at least two receiver means for receiving said RF signal; and means for selectively directing said single notch toward one of said at least two receiver means.

2. The combination of claim 1 wherein said notch comprises a beam pattern null.

3. The combination of claim 2 and additionally including means for adjusting the amplitude of said RF signal coupled between said RF signal generating means and said first and second antenna means.

4. The combination of claim 2 and additionally including means for adjusting the phase of said RF signal coupled between said RF signal generating means and at least one of said first and second antenna means for providing a mutual 180° phase difference of RF signal coupled to said first and second antenna means.

5. The combination of claim 2 and additionally including means for adjusting the amplitude and phase of said RF signal coupled between said means for generating an RF signal and at least one of said first and second antenna means.

6. The combination of claim 5 wherein said means for adjusting the amplitude and phase includes means for inverting the phase of said RF signal coupled to one of said antenna means relative to said RF signal power coupled to the other of antenna means whereby cancellation of the radiated power results in substantially all directions of space except in the region of beam pattern null.

7. The combination of claim 6 wherein said means for coupling substantially equal amplitudes of RF signal includes a power divider circuit.

8. The combination of claim 5 wherein said means for adjusting the amplitude and phase includes means for coupling substantially equal amplitudes of said RF signal from said means for generating an RF signal and said first and second antenna means.

9. The combination of claim 8 and wherein said means for adjusting the amplitude and phase additionally includes means for varying the phase of the power coupled to one of said antenna means by substantially 180° relative to the phase of the power coupled to the other said antenna means.

10. A method of transmitting electromagnetic radiation in a multiple access signal communications system, comprising the steps of:

generating an RF signal modulated with a communication signal;

coupling said RF signal to first antenna means and generating a first substantially omnidirectional antenna beam pattern;

coupling said RF signal to second antenna means and generating a second substantially omnidirectional antenna beam pattern having a signal notch of narrow angular beamwidth;

generating a composite antenna beam pattern of a relatively narrow angular beamwidth from said first and second beam patterns directing said single notch toward one of at least two spaced receivers; and receiving said RF signal with one of said at least two spaced receivers.

11. The method of claim 10 wherein said notch comprises a beam pattern null.

12. The method of claim 11 and additionally including the step of adjusting the amplitude of said RF signal coupled to said first and second antenna means.

13. The method of claim 11 and additionally including the step of adjusting the phase of said RF signal coupled to at least one of said antenna means for providing a 180° phase shift of said RF signal coupled to said one antenna.

14. The method of claim 11 and additionally including the step of adjusting the amplitude and phase of said RF signal coupled to at least one of said first and second antenna means.

15. The method of claim 14 wherein said step of adjusting the amplitude and phase further includes inverting the phase of said RF signal coupled to one of said antenna means relative to said RF signal power coupled to the other antenna of said antenna means whereby cancellation of radiated power results in substantially all directions of space except in the region of said beam pattern null.

16. The method of claim 14 wherein said step of adjusting the amplitude and phase further includes coupling substantially equal amplitudes of said RF signal to said first and second antenna means.

17. The method of claim 16 and wherein said step of adjusting the amplitude and phase further includes varying the phase of the power coupled to one of said antenna means by substantially 180° relative to the phase of the power coupled to the other said antenna means.

18. The combination of claim 1 wherein said notch comprises a relatively steep slope beam pattern null whereby said beam pattern null is of substantially equal amplitude over said notch.

* * * * *